E. DAVOUST.
PASTRY MOLD.
APPLICATION FILED MAR. 22, 1916.
1,219,711. Patented Mar. 20, 1917.
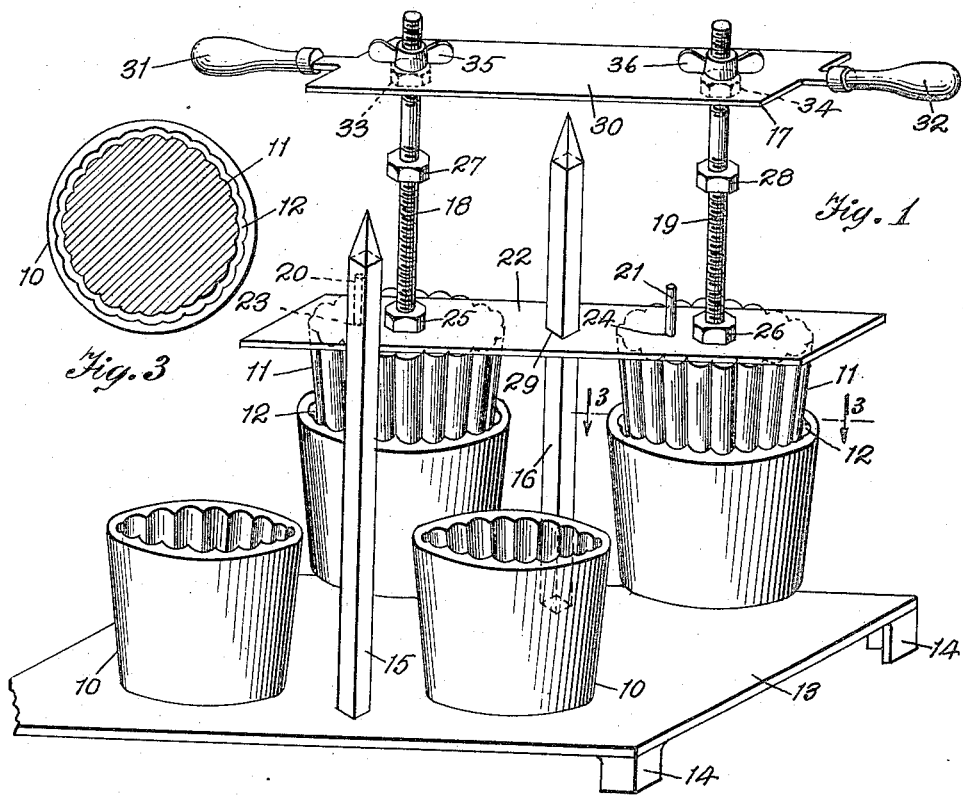
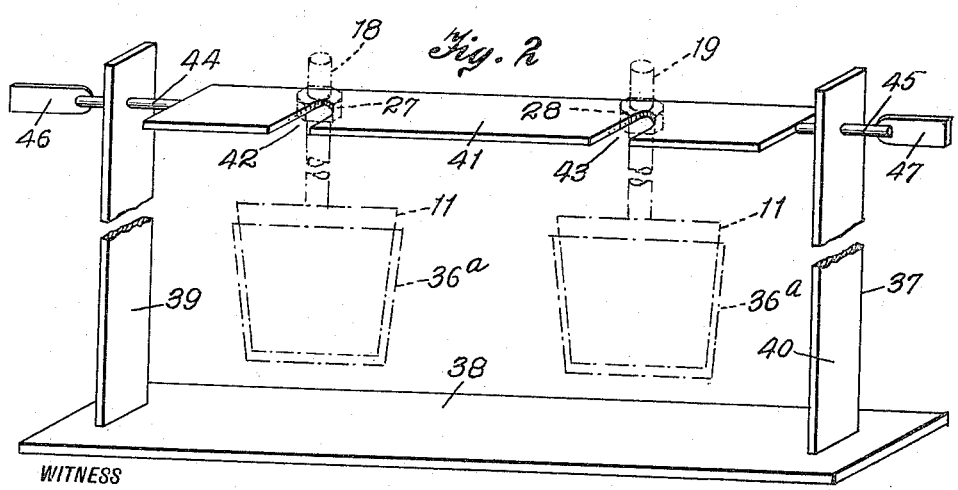
WITNESS
A. Spitznagel
INVENTOR
Elie Davoust
BY
W. T. Criswell
ATTORNEY

UNITED STATES PATENT OFFICE.

ELIE DAVOUST, OF NEW YORK, N. Y.

PASTRY-MOLD.

1,219,711.  Specification of Letters Patent.  Patented Mar. 20, 1917.

Application filed March 22, 1916. Serial No. 85,876.

*To all whom it may concern:*

Be it known that I, ELIE DAVOUST, a citizen of the Republic of France, and a resident of New York, county and State of New York, have invented a certain new and useful Improvement in Pastry-Molds, of which the following is a full, clear, and exact specification.

This invention relates to a class of apparatus adapted to be used for baking pastry.

My invention has for its object primarily to provide a mold designed to be employed for making pastry casseroles, or shells, or forms whereby salads, entrées, custards and other delicacies may be attractively and temptingly served, and which is adapted to permit edible shells of various designs and sizes to be readily made without requiring the work of expert bakers as well as avoiding the requirement for using fancy glass and china casseroles, or other side dishes. The invention consists essentially of one, or a number of female members, or cups, and one, or a suitable number of complemental male members, or shapers adapted to be removably inserted in the female members, the male members being smaller than the female members so as to provide a suitable space between the members. The female members are preferably held stationary on a base, while the male members are mounted on a frame adapted to be removably applied to the base of the female members.

Other objects of the invention are to provide on the base a guide whereby the male members will be accurately centered in the female members; to provide on the frame a removable handle member to allow the male members to be conveniently separated from the female members for removal of the pastry shells when baked; and to provide a support for the male members and the frame when removed from the female members.

A further object of the invention is to provide a pastry mold of simple, efficient, and very durable construction, and which is susceptible of being made so that pastry shells of different shapes and sizes may be made.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a perspective view of one form of pastry mold embodying my invention.

Fig. 2 is a perspective view, partly broken away and partly fragmentary, of the separate support used in conjunction with the apparatus, and Fig. 3 is a sectional view taken on the line 3—3 of Fig. 1.

The apparatus, or pastry mold has one, or a number of female members, or cups 10 as well as having one, or a suitable number of complemental male members, or shapers 11, though in the drawing four of the female members and two of the male members are shown. The interior of the female members, or cups 10 may be of any desired sizes, shapes and designs, for instance they may be corrugated, or fluted, while the exterior of the male members, or shapers 11 are formed in shapes and designs corresponding to the interior of the cups, the shapers being considerably smaller than the cups so as to be freely accommodated when inserted therein as well as to provide a space, as 12, between each shaper and its cup to allow pastry casseroles, or shells, or forms to be made, as will be hereinafter more fully explained.

The female members, or cups 10 as well as the male members, or shapers 11 together with the apparatus in entirety may be made of cast iron, or other metal, or material capable of withstanding the heat during the process of baking the pastry molds, and the cups 10 are held stationary at spaced intervals preferably in rows on the top of a base, or plate, as 13, supported on a number of legs, as 14. Projecting upwardly from the base-plate 13, and between each pair of the cups 10 are vertically disposed square posts, or guides 15 and 16 serving to cause the shapers 11 to be accurately centered in the cups of each pair.

The male members, or shapers 11 are arranged on a frame, as 17, for permitting the shapers to be conveniently inserted and removed from the cups 10. The frame 17 has two threaded rods, or stems 18 and 19 one of which extends vertically upward from the center of the top of each of the shapers, and also from the tops of these shapers may be pins 20 and 21 each pin being spaced from each of the rods. On the top of the shapers 11 is a removable plate 22 having two spaced openings, not shown, through which the rods 18 and 19 are disposed, and this plate also has two spaced holes 23 and 24 through which the pins 20 and 21 are guided for preventing the plate 22 from accidentally shifting when resting on the shapers, as illustrated in Fig. 1. To releasably clamp the plate 22 on the top of the shapers 11, on the rods 18 and 19 are nuts 25 and 26 which are screwed home against the top of the plate 22, and also on the central parts of these rods are nuts 27 and 28 adapted to be screwed to suitable positions on the rods. Through the central part of the plate 22 is a square opening 29 of a size to freely admit the posts 15 and 16. Each of these posts is arranged relatively to each pair of the cups 10, while the opening 29 is provided in a part of the plate 22 so that when the plate is guided over one of the posts the shapers 11 will be accurately centered in the next adjacent cups as well as being held against lateral movement by reason of the angular shapes of the posts and the opening 29. The space between the shapers 11 and the cups 10 circumferentially will then be even and regular, and to allow the shapers to be manually inserted in and removed from the cups 10 on the upper ends of the rods 18 and 19 is a detachable bar 30 having handles 31 and 32 on its ends, the rods passing through two openings in the bar. The bar 30 is movably supported on two nuts 33 and 34 which are screwed on the rods so that by rotating these nuts accordingly the bar may be adjusted to various heights with respect to the shapers, and to detachably hold the bar against movement on the ends of the rods above the bar are threaded two finger nuts 35 and 36. By screwing the nuts 35 and 36 downwardly on the rods, the bar 30 will be releasably held between the finger nuts and the nuts 33 and 34.

When the apparatus is employed for making pastry casseroles, or shells, or forms for serving salads, entrées, custards, and other delicacies, a suitable batter of edible pastry is provided. After the shapers 11 are removed from the cups 10 by grasping the handles 31 and 32 to lift the frame 17, the interior of the cups and the exterior of the shapers are greased in the usual manner. By then dipping the shapers into the batter a coating of the batter will adhere thereto, the batter being made of a required consistency. The shapers with the coating of batter are afterward re-inserted in the cups by guiding the plate 22 over the post between the cups in which the shapers are disposed, and by exertion of required force the shapers will be sunken into the cups for properly forming shells of the batter. The entire apparatus with the shells of batter are then placed in a pan of grease for frying the shells, or otherwise subjected to heat for baking the shells, and after the apparatus has been removed from the oven by again lifting the frame 17 in a similar manner for removing the shapers from the cups 10 the pastry shells will by adhering to the shapers be also removed from the cups. The frame 17 with the shapers 11 and the baked pastry shells, as 36ª Fig. 2, may be subsequently placed on a separate support, as 37. The support 37 is preferably constructed with a base 38 having two spaced standards 39 and 40 projecting upwardly from its top, and between these standards is a flat plate, or bar 41 with two recesses, as 42 and 43, which are spaced at distances so that the rods 18 and 19 of the frame 17 will be admitted therein. Extending in opposite directions from the ends of the plate 41 are rods 44 and 45 rotatably disposed through apertures in the upper parts of the standards, and on the end of these rods are handles 46 and 47. By manually turning these handles the rods 44 and 45 as well as the plate 41 will be accordingly revolved. When the frame 17 and the shapers 11 with the baked pastry shells thereon are positioned on the support 37 the rods 18 and 19 are disposed in the recesses 42 and 43 of the plate 41 so that the nuts 27 and 28 will rest on the top of this plate, and the frame with the shapers together with the pastry shells will be suspended on the frame. By then revolubly moving the handles 46 and 47 the plate 41 and frame 17 may be guided to swing the shapers 11 with the pastry shells above the support 37 to allow the pastry shells to be removed from the shapers. Thus a simple and efficient mold is provided for making pastry casseroles, or shells, or forms whereby salads, entrées, custards and other delicacies may be invitingly and daintily served without requiring the use of fancy glass and china casseroles, or other side dishes.

In the foregoing description, I have embodied the preferred form of my invention, but I do not wish to be understood as limiting myself thereto as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a pastry mold, a base, a plurality of stationary female members on the base, a plurality of complemental male members each adapted to be removably inserted in one of the female members, and the male members being smaller than the interior of the female members to provide a space between the members, a removable plate on the male members for spacing the male members accurately over the female members, and a second plate removably attached to said male members whereby they may be removed from the female members and transferred for drying.

2. In a pastry mold, a base, a plurality of stationary cups on the base, a plurality of shapers each adapted to be removably inserted in one of the cups, a plurality of rods one extending from each of the shapers, a plate removably disposed on the rods for spacing the shapers so as to be accurately centered in the cups, together with a second plate removably attached to said rods whereby the shapers may be removed from the cups and transferred for drying.

3. In a pastry mold, a base, a post on the base, a plurality of spaced stationary cups on the base, a plurality of shapers each adapted to be removably inserted in one of the cups, a plurality of rods one extending from each of the shapers, an apertured plate removably disposed on the rods for spacing the shapers, said plate being adapted to pass over said post so as to accurately center the shapers in the cups, together with a second plate removably attached to said rods whereby the shapers may be removed from the cups and transferred for drying, and means on the rods for releasably clamping the first mentioned plate on the shapers.

4. In a pastry mold, a base plate having a plurality of cups mounted thereon, guide posts arranged intermediate any group of adjacent cups, a plate slidably mounted on each of said posts and held against radial movement thereon, a plurality of rods passing through said plate, a shaper secured to each of said rods, means for holding said shapers firmly against said plate, and a second plate secured to the upper ends of said rods whereby said shapers may be removed from said cups and transferred for drying.

This specification signed and witnessed this 21st day of March A. D. 1916.

ELIE DAVOUST.

Witness:
JOHN F. PHELAN.

Copies of this patent may be obtained for five cents each, by addressing the "Commissioner of Patents, Washington, D. C."